July 7, 1925.
W. H. McCLELLAND
1,545,341
DUMP TABLE ARM
Filed Dec. 15, 1924
3 Sheets-Sheet 1
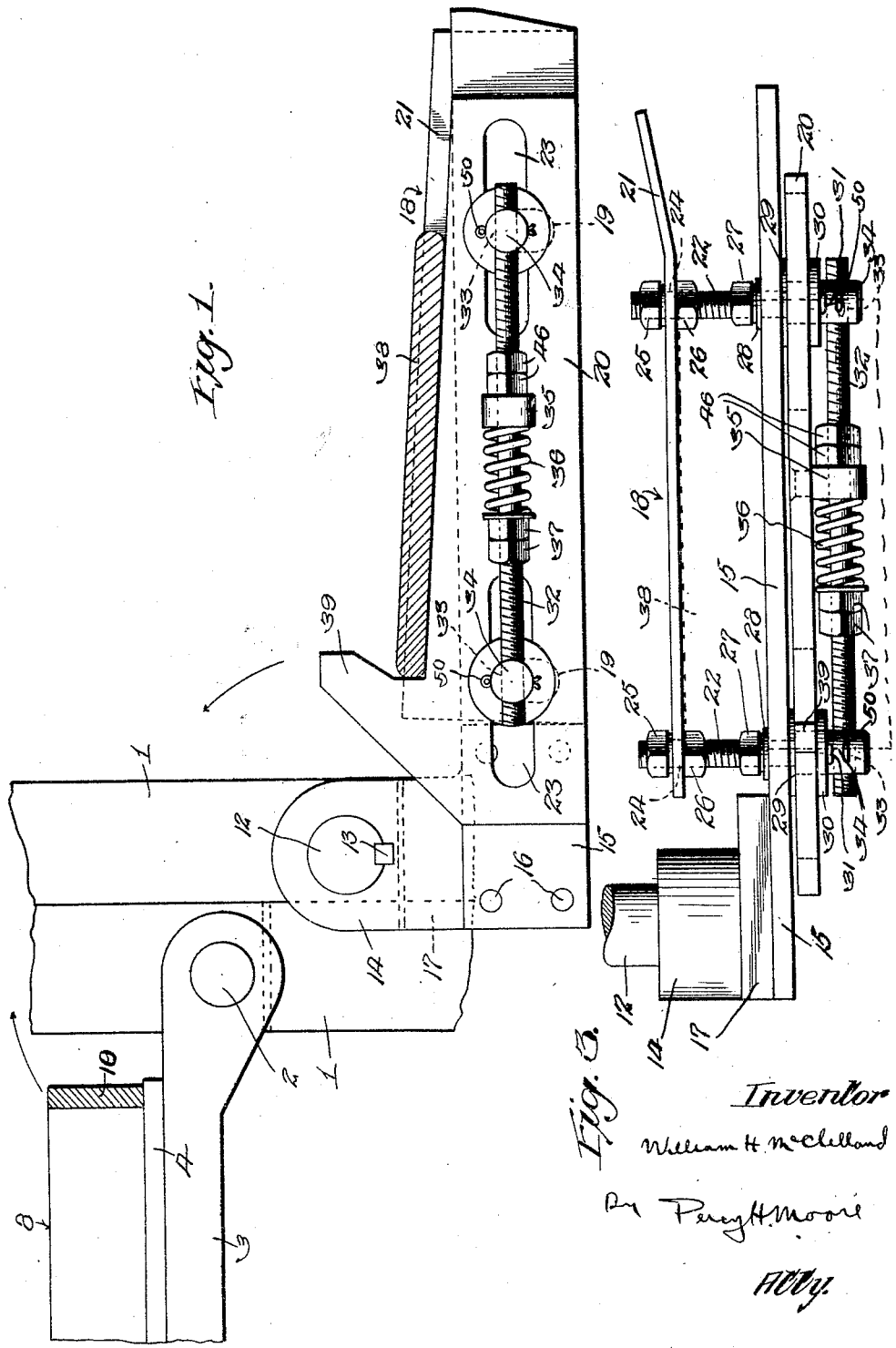
Inventor
William H. McClelland
By Percy H. Moore
Atty.

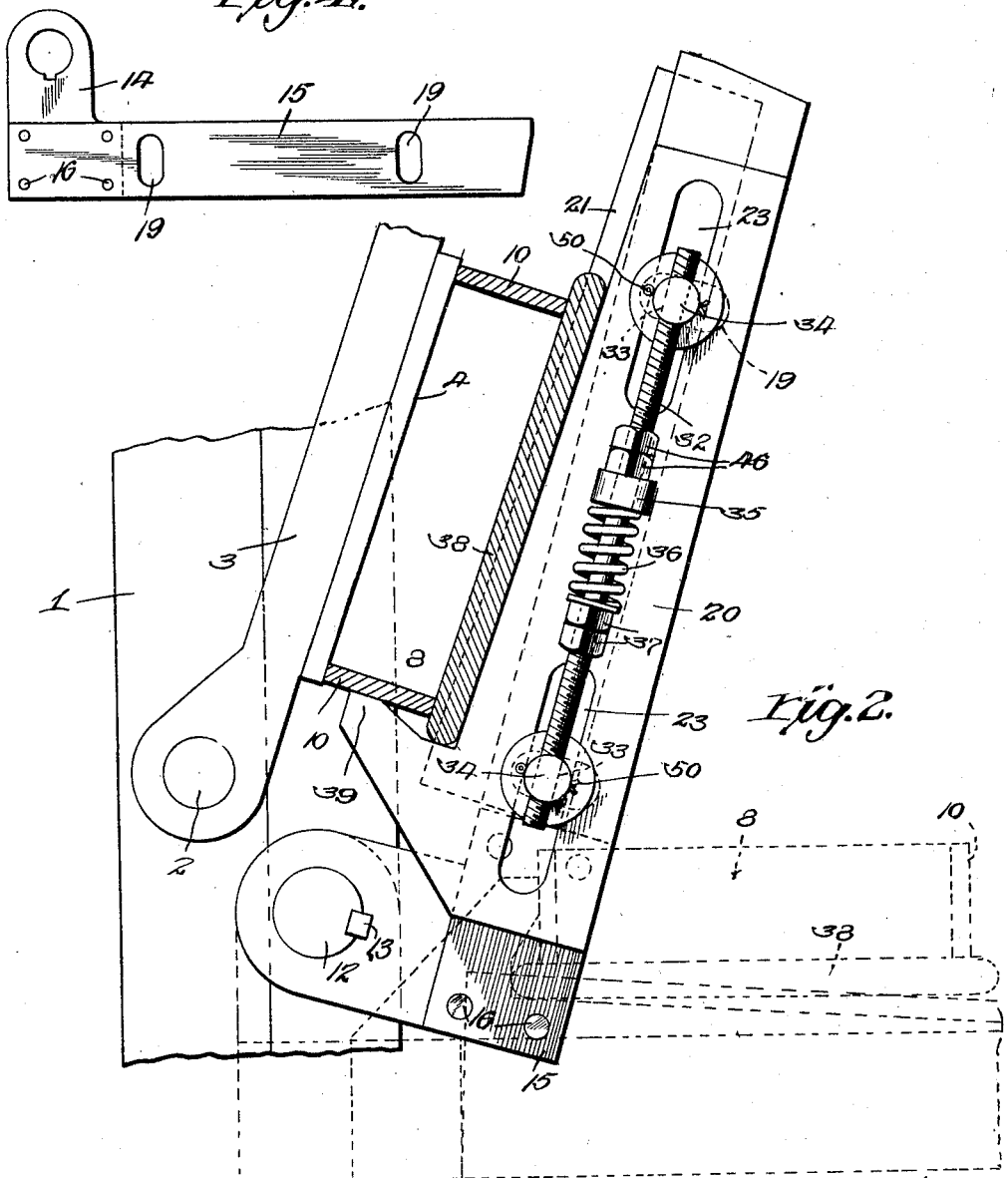

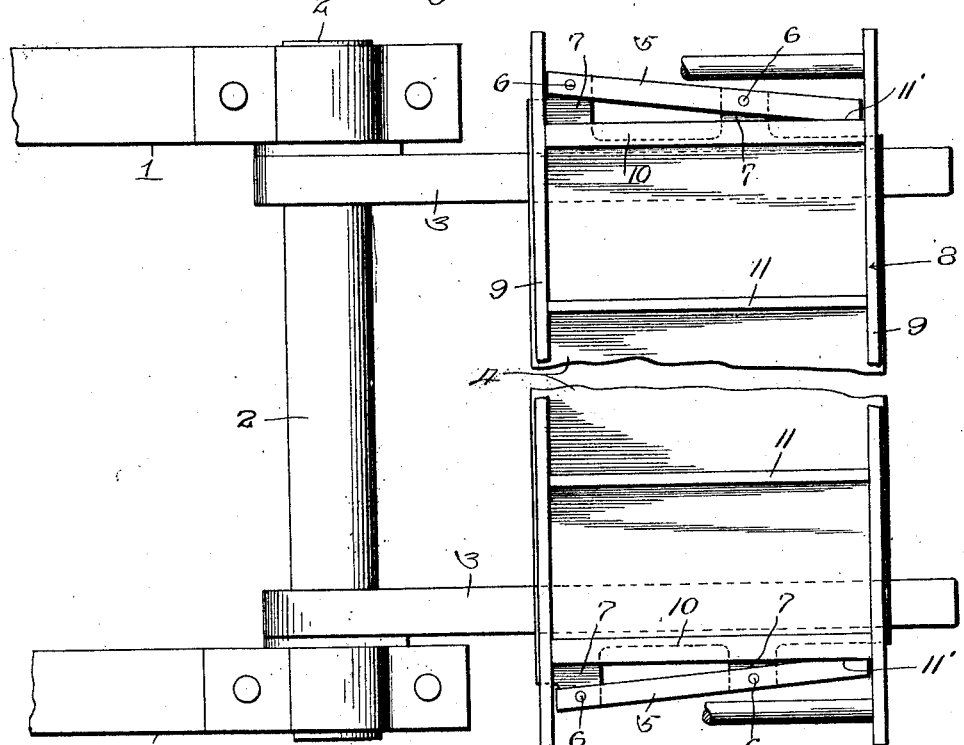
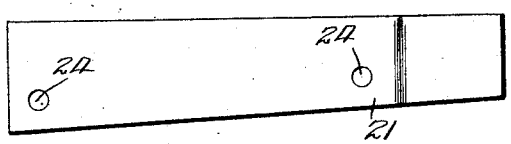
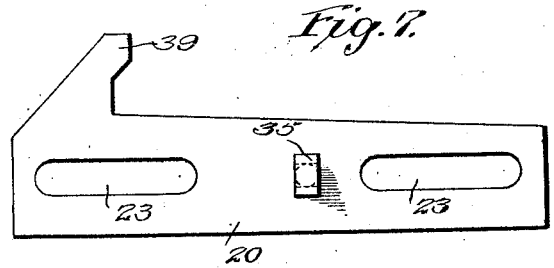

Patented July 7, 1925.

1,545,341

UNITED STATES PATENT OFFICE.

WILLIAM H. McCLELLAND, OF HUNTINGDON, PENNSYLVANIA, ASSIGNOR, BY MESNE ASSIGNMENTS, TO ROY P. M. DAVIS, OF MOUNT UNION, PENNSYLVANIA.

DUMP-TABLE ARM.

Application filed December 15, 1924. Serial No. 755,937.

*To all whom it may concern:*

Be it known that WILLIAM H. McCLELLAND, a citizen of the United States of America, residing at Huntingdon, in the county of Huntingdon and State of Pennsylvania, has invented certain new and useful Improvements in Dump-Table Arms, of which the following is a specification.

My invention relates to dump table arms or saddles to which the brick mold and brick therein are delivered preparatory to being delivered to the stripping mechanism of a brick making machine.

One of the objects of my invention is to provide simple and efficient means for securely holding the mold between the mold plate and pallet during the mold dumping operation.

Another object of my invention is to provide adjustable means for compensating for molds of various thickness.

A still further object is to provide means for facilitating the disengagement of the mold from the mold securing means on the mold plate, during the mold dumping operation.

In the accompanying drawings forming part of this specification:

Figure 1 is a fragmentary side view of my invention showing the mold supports and mold, and dump table arms before the initial movement towards dumping position;

Figure 2 is a view similar to Figure 1 showing the mold and dump table arms in the position assumed when the mold is delivered to the arms, the final or dumping position of the mold and dump table arms being also shown in this view in dotted lines;

Figure 3 is a plan view of one of the two dump table arms which comprise the saddle;

Figure 4 is a fragmentary detail view of one of the dump table arms;

Figure 5 is a plan view of the dump table arms showing a mold and mold plate thereon.

Figure 6 is a detail view of one of the pallet guide bars; and

Figure 7 is a detail view of one of the adjustable bars.

Referring more particularly to the drawings wherein like reference numerals designate corresponding parts throughout the several views, 1, denotes a part of the frame of a brick making machine in which a shaft 2, is suitably journaled. Mounted on this shaft 2, in spaced relation are two mold supports or arms 3, to which are permanently secured in any desired manner a mold plate 4. As will be readily understood the mold plate 4, rests upon and spans the mold supports 3.

The mold plate 4, is provided at each end with rearwardly and inwardly inclined guide bars 5, which are bolted as at 6, to lugs 7, projecting from the ends of the mold plate.

Molds 8, which are placed upon the mold plate 4, by the mold delivery mechanism (not shown) are of skeleton formation, comprising side walls 9, end walls 10, and partitions 11. When a mold 8, is in position on the plate 4, the end walls 10, of the mold are snugly engaged between the forward beveled ends 11′, of the bars 5, the opposite ends of the bars 5, engaging the respective ends of the side walls 9, of the mold. It will thus be seen that the mold is locked firmly to the mold plate and thus prevented from lateral or longitudinal movement. The molds are delivered to a saddle 18, comprising a shaft 12, suitably journaled in the frame 1, at one side of and slightly below the shaft 2. Secured to the shaft 12, as by key 13, is an angularly disposed sleeve member 14, which is bolted to a dump table arm 15, as at 16, by means of a flange 17. These dump table arms are formed with transverse, normally vertically disposed slots 19, for a purpose about to be described.

Secured to the inner face or side of each bar 15, of the saddle 18, and substantially parallel therewith is a longitudinally adjustable slide bar 20. Pallet guides 21, are secured to the outer face or side of the bars 15. Headed bolts 22, passing through elongated slots 23, formed in the adjustable bars 20, thence through the transverse slots 19, in the arms 15, and finally through openings 24, in the pallet guides 21, support the bars 20, and the guides 21.

Nuts 25 and 26 on opposite sides of the guides 21, serve to clamp the latter in place, and nuts 27, washers 28, 29 and 30, and cotter pins 31, serve to clamp the adjustable bars 20, frictionally to the arms 15. The threaded ends of rods 32, threadedly extend through corresponding threaded openings 33, in the enlarged heads 34, of the bolts 22.

The rods 32, also pass slidably through eyes 35, fixed to the adjustable bars 20. Coil springs 36, are confined on the rods 32, between the eyes 35, and tension lock nuts 37. The threaded rods 32 are prevented from turning by means of cotter pins 50 extending through the enlarged heads 34 of the bolts 22 into the rod 32.

Adjustment of the slide bars 20, in a vertical direction or laterally with respect to the arms 15, to compensate for molds of different thicknesses is effected by unscrewing the nuts 27, and adjusting the bolts 22, in the slots 19. Adjustment for molds of different widths is obtained by screwing up the nuts 46. After proper adjustment has been made the nuts 27, are tightened.

After the mold 8, containing the slicked brick is moved to Figure 1 or dump table position, opposite the saddle 18, upon which a pallet 38, has been previously slid between the guides 21, by any desired means (not shown) the shafts 2 and 12, are caused to rotate in clockwise and anti-clockwise direction respectively until the mold and pallet meet at the vertical position (not shown). During this movement the side wall of the mold strikes the hook ends 39, of slide bars 20, a wiping blow, forcing these bars downwardly against the tension of the coil springs 36, as the mold approaches into contact with the pallet. This movement is limited by lock nuts 46. Any variation in the width of molds is also taken care of by reason of the frictional engagement between the bars 20, and the arms 15, permitting of the bars 20, moving laterally with respect to the arms 15.

When the vertical position has been reached by the mold and saddle, the anti-clockwise movement of the shafts 12, is reversed but the clockwise movement of the shaft 2, continues until the saddle and mold reach Figure 2 position or about 20° past the vertical. At this point an anti-clockwise movement is imparted to the shaft 2, and mold supports 3, to return them to normal horizontal position, the clockwise movement of the shafts 12, and saddle 18, continuing. This causes the saddle with the pallet and mold thereon to separate from the mold supports 3, the spring 36, at this instant returning the slide bars 20, to their original or normal position thus, raising the mold off the inclined bars 5, on the mold plate 2.

At the instant of separation of mold 8, and mold plate 4, it is essential that the mold be confined between the plate and pallet, otherwise the brick will be damaged by the jar incident to the taking up of any play. The slots 19, permit of the necessary adjustment to provide a tight clamping action between the mold and pallet, as well as adjustment to compensate for variation in thickness of the molds.

From the dotted line position shown in Figure 2, the mold and brick and pallet are moved in any desired manner to the stripper mechanism (not shown).

Having thus described my invention what I claim is:

1. In a brick making machine a pivoted mold support, mold holding means on said support, a pivoted saddle having dump table arms, said saddle and support being swingable toward and away from each other, slidable bars secured to said dump table arms, said arms adapted to engage and remove a mold from said mold holding means.

2. In a brick making machine a pivoted mold support, a pivoted saddle, said saddle and support being movable toward and away from each other, and adjustable means secured to said saddle for receiving a mold from said support.

3. In a brick making machine, a pivoted mold support, a pivoted saddle having dump table arms, means secured to said arms for receiving a mold from said support, said means being transversely adjustable with respect to said dump table arms.

4. In a brick making machine a pivoted mold support, a pivoted saddle having dump table arms, means secured to said arms for receiving a mold from said support, said means being longitudinally slidable with respect to said arms.

5. In a brick making machine a pivoted mold support, a pivoted saddle having dump table arms, bars secured to said arms for receiving a mold from said support, said bars being longitudinally slidable and vertically adjustable with respect to the arms.

6. In a brick making machine, a pivoted mold support, a pivoted saddle having dump table arms for receiving a mold from said support, a pallet guide and a slidable bar on opposite sides of each of said arms, springs for opposing sliding movement of said bars in one direction, and means on said bars adapted to be engaged by the mold to move said bars against the tension of said springs.

7. In a brick making machine a pivoted mold support, a pivoted saddle having dump table arms, said support and saddle being swingable toward and away from each other, slidable bars secured to said arms for receiving a mold from said support, said bars having hooked shaped ends adapted to be engaged by the mold when said support and saddle are swung toward each other.

In testimony whereof I affix my signature in presence of two witnesses.

WILLIAM H. McCLELLAND.

Witnesses:
H. T. WILLIAMS,
M. W. SHAVER.